Nov. 26, 1968  S. A. STEINBACK  3,412,941
HOSE NOZZLE
Filed Feb. 10, 1966  2 Sheets-Sheet 1
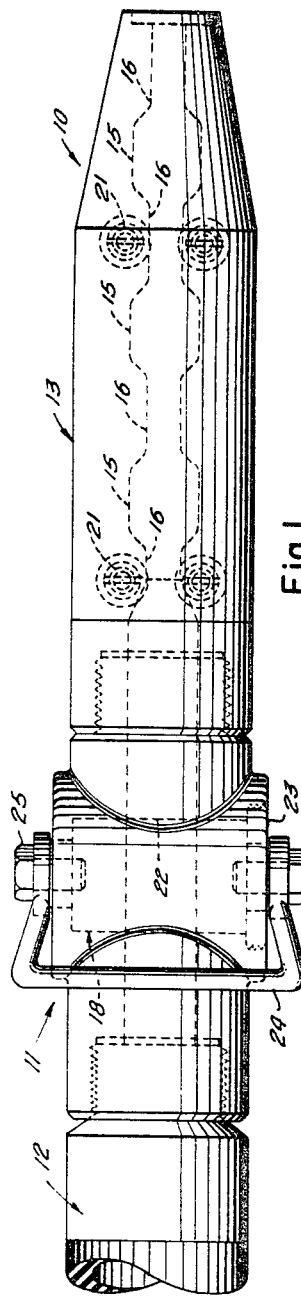
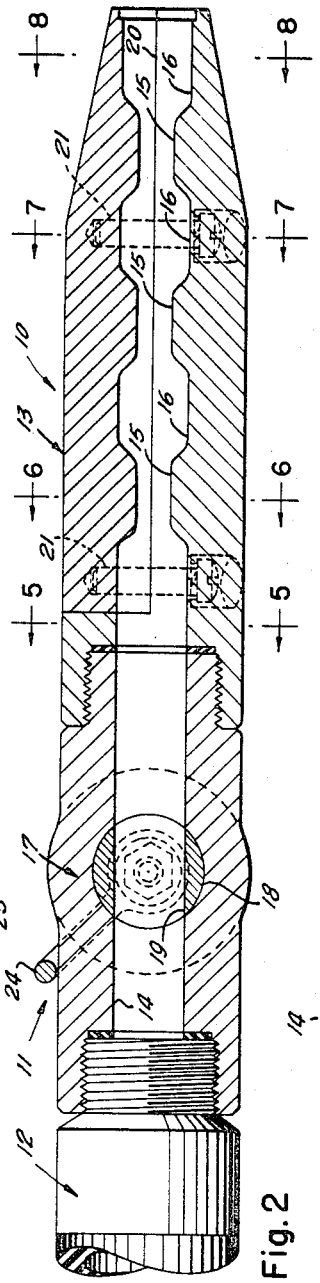
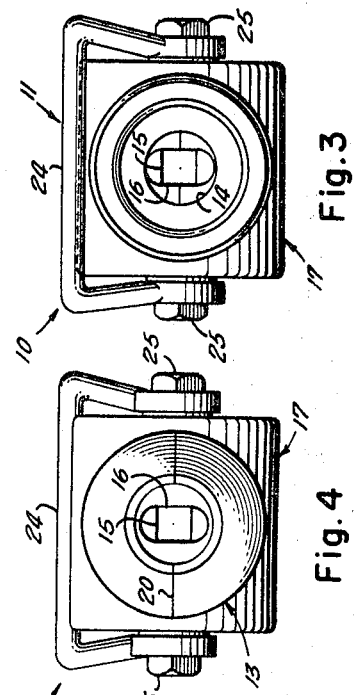
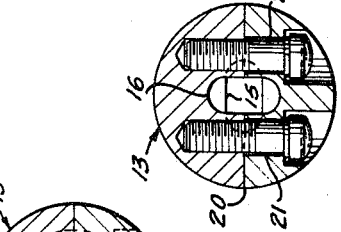
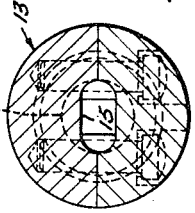
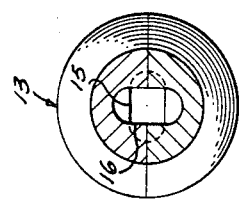
INVENTOR
Sillick A. Steinback
BY
ATTORNEY INVENTOR
Sillick A. Steinback

ATTORNEY

United States Patent Office 3,412,941
Patented Nov. 26, 1968

3,412,941
HOSE NOZZLE
Sillick Arthur Steinback, 2717 Bilglade,
Fort Worth, Tex. 76133
Filed Feb. 10, 1966, Ser. No. 526,472
3 Claims. (Cl. 239—569)

ABSTRACT OF THE DISCLOSURE

The invention described herein comprises a nozzle for attachment to a fire hose, or for use where high velocity streams of water or chemicals are required, as in fighting fire or in hydraulic mining operations. The nozzle has an axial flow passage of uniform capacity throughout its length formed with a series of chambers having planar walls in parallel planes and disposed in alternate transverse arrangement with respect to each other whereby to provide a tortuous fluid flow therethrough resulting in the discharge of a high velocity stream capable of maximum volume and projection and minimizing nozzle spray and droplets at the outlet which tend to reduce the efficiency of the conventional nozzle.

---

This invention relates to a hose nozzle, and it has particular reference to a hose nozzle for heavy duty use, as in fire hose, for directing high pressure, high velocity streams of water or chemicals, as the case may be, at the scene of a fire, and for other like use, as in hydraulic mining and earth moving operations.

A prime object of the invention is that of providing an improved hose nozzle for use as described whereby a high pressure, high velocity stream of water or other fluid as supplied to the nozzle is adapted to be discharged therefrom at substantially higher velocity, in the form of a shaped stream of reduced cross sectional area, and may be directed at a target some distance away, which is advantageous from the standpoint of safety in the case of fire hose for the reason that firemen using the hose do not have to stand so close to the fire, and whereby the action of the hose is more effective, as in hydraulic mining and earth moving.

A further object of the invention resides in the provision of an improved hose nozzle as described having a barrel of novel design whereby a stream of water or other fluid as supplied to the nozzle is caused to traverse a path of restricted cross sectional area, while at the same time changing its direction of flow repeatedly, and finally is discharged from the nozzle at substantially higher velocity in the form of a shaped stream aligned with the longitudinal axis of said barrel and having a cross sectional pattern and dimensions corresponding to the inside of said barrel at its discharge end.

Broadly, the invention contemplates the provision of an improved hose nozzle as described having a barrel of novel design having a series of communicating, axially aligned fluid chambers therein, said chambers being substantially planar in transverse section and adjoining chambers being positioned at right angles relative to each other, the maximum widths of said chambers corresponding substantially to the inside diameter of said barrel at its inlet end and the minimum widths of said chambers being substantially one-half their maximum widths, whereby a stream of water or other fluid as supplied to the nozzle is caused to traverse a path of restricted cross sectional area, while at the same time changing its direction of flow repeatedly, as it flows successively through said chambers.

While the foregoing objects are paramount, other and lesser objects will become apparent as the description proceeds, when considered in connection with the appended drawings wherein:

FIGURE 1 is a longitudinal view of a hose nozzle embodying the invention, showing one side thereof.

FIGURE 2 is a longitudinal view, partly in section taken on a median line, taken at right angles to the view shown in FIGURE 1.

FIGURES 3 and 4 are transverse views showing the inlet and discharge ends, respectively, of the nozzle illustrated in FIGURE 2.

FIGURES 5, 6, 7, and 8 are transverse sectional views taken on the lines 5—5, 6—6, 7—7, and 8—8, respectively, of FIGURE 2.

Figure 9:
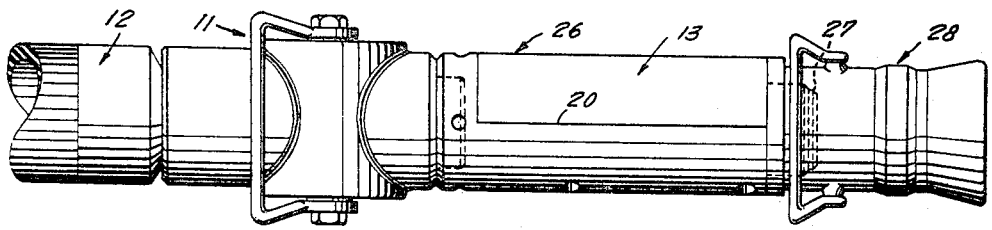

FIGURE 9 is a view similar to FIGURE 1, showing a tubular adapter for a hose nozzle embodying the invention in modified form.

Figure 10:
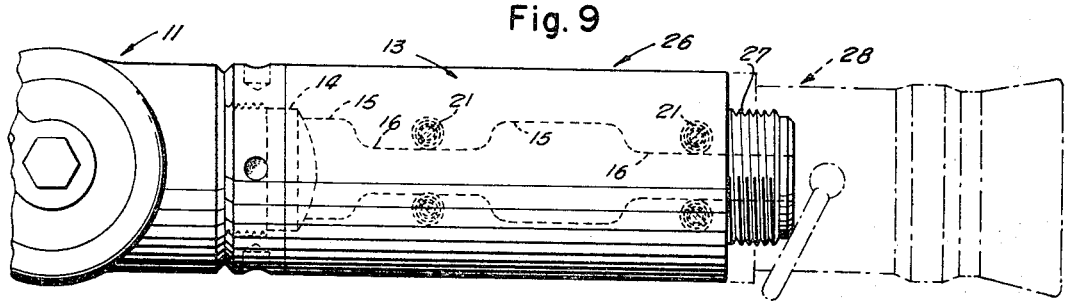

FIGURE 10 is a longitudinal view on an enlarged scale taken at right angles to the view shown in FIGURE 9.

Figure 11:
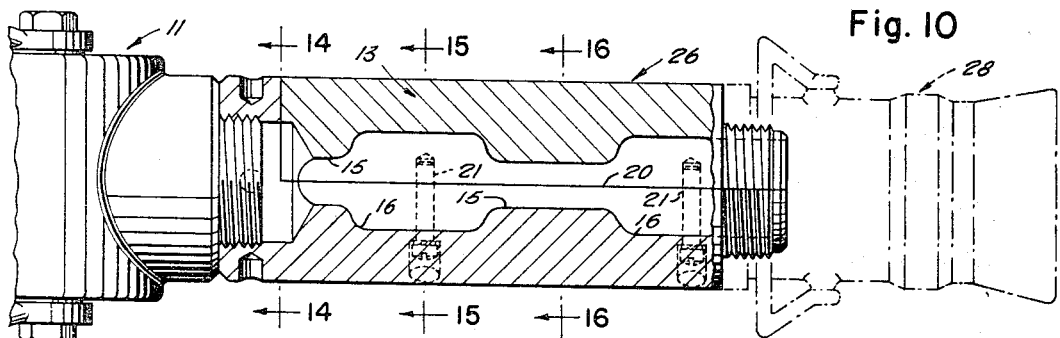

FIGURE 11 is a longitudinal view, partly in section taken on a medium line, taken at right angles to the view shown in FIGURE 10.

Figure 12:
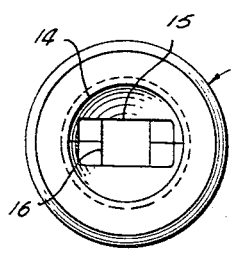
Figure 13:
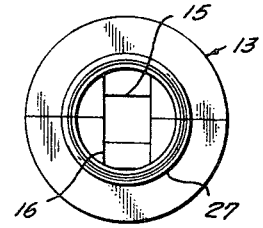
Figure 14:
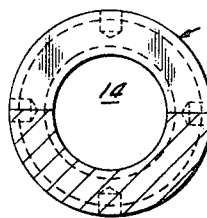
Figure 15:
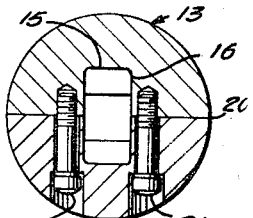
Figure 16:
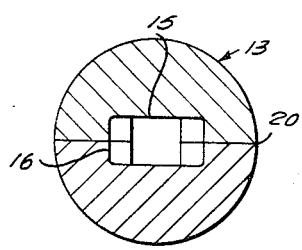

FIGURES 12 and 13 are transverse views showing the inlet and discharge ends, respectively, of the adapter as illustrated in FIGURE 11, and FIGURES 14, 15, and 16 are transverse sectional views taken on the lines 14—14, 15—15, and 16—16, respectively, of FIGURE 11.

Referring to the invention as illustrated in FIGURES 1 to 8, inclusive, the numeral 10 designates generally a hose nozzle embodying the invention, which is threaded at one end, whereby it is removably connected to a valve 11, which in turn is connected by threads to one end of a hose, shown fragmentarily in broken lines in FIGURES 1 and 2 and indicated generally by the numeral 12.

The nozzle 10 includes an elongated tubular barrel, indicated generally by the numeral 13, having a longitudinal bore 14 beginning at its inlet end and having a series of axially aligned chambers therein as hereinafter described. Said chambers are substantially planar in transverse section, and adjoining chambers, which are designated by the numerals 15, 16, respectively, are positioned at right angles to each other.

The chambers 15, 16, which are in fluid communication with each other and with the bore 14, extend from the inner end of the bore 14 to the discharge end of the barrel 13. The maximum width of the chambers 15, 16 corresponds substantially to the diameter of the bore 14, and the minimum width of the chambers 15, 16 is substantially one-half their maximum width.

The valve 11 has a rotatable plug 18 which is arranged transversely of the bore 14. The plug 18 has a fluid passage 19 therein which communicates with the bore 14 in the open position of the valve 17.

For convenience in manufacture the barrel 13 advantageously may be formed in two separable sections, as shown best in FIGURE 2, whereby it is split along its longitudinal center line, beginning at its discharge end, as at 20, said sections being removably connected by two pairs of bolts 21.

The rotatable plug 18, which is received in a transverse opening 22 therefor in the barrel 13 and secured therein by a threaded closure member 23, has a handle 24 which is rigidly connected to opposite ends of the plug 18 by a pair of bolts 25.

In the modified form of the invention shown in FIGURES 9 to 16, a tubular adapter 26, which is in other respects similar to the nozzle 10 shown in FIGURE 1 and FIGURES 2 to 8, inclusive, is threaded at its discharge end, as at 27, for engagement by a separate nozzle, such as a foam nozzle, shown in solid lines in FIGURE 9 and in broken lines in FIGURES 10 and 11, and designated generally by the numeral 28. The tubular adapter 26 shown in FIGURES 9 to 16, is substantially shorter than the nozzle 10, and has fewer of the fluid chambers 15 and 16.

What is claimed is:

1. In a nozzle for attachment to a flexible conduit, the said nozzle having a valve in its attaching end and a flow passage therethrough, the said passage being formed with a series of communicating chambers having parallel planar walls, each having the same lateral and longitudinal dimensions, and arranged in alternate transverse planar relationship to each other, and threaded means in the inlet end of said nozzle for attaching the same to a flexible hose.

2. A nozzle for attachment to a flexible conduit, such as a fire hose, as described in claim 1, wherein the said valve is embodied in a body threadedly connected to said nozzle between said conduit and said nozzle.

3. In a nozzle as described in claim 1, having a body portion threaded at each end providing means for attachment of said body to a flow conduit and for attaching a valve to the discharge end of said body portion.

References Cited

UNITED STATES PATENTS

| | | | |
|---|---|---|---|
| 1,191,621 | 7/1916 | Schmidt | 239—487 |
| 541,716 | 6/1895 | Callahan | 239—569 X |
| 946,228 | 1/1910 | Kenlon | 239—569 X |
| 2,985,384 | 5/1961 | Martin | 239—569 X |

FOREIGN PATENTS

| | | |
|---|---|---|
| 84,030 | 2/1920 | Switzerland. |

ALLEN N. KNOWLES, *Primary Examiner.*

H. NATTER, *Assistant Examiner.*